Sept. 8, 1964    J. J. ROGERS    3,147,871
LOW-BOY TRAILER
Filed Nov. 20, 1961    2 Sheets-Sheet 1
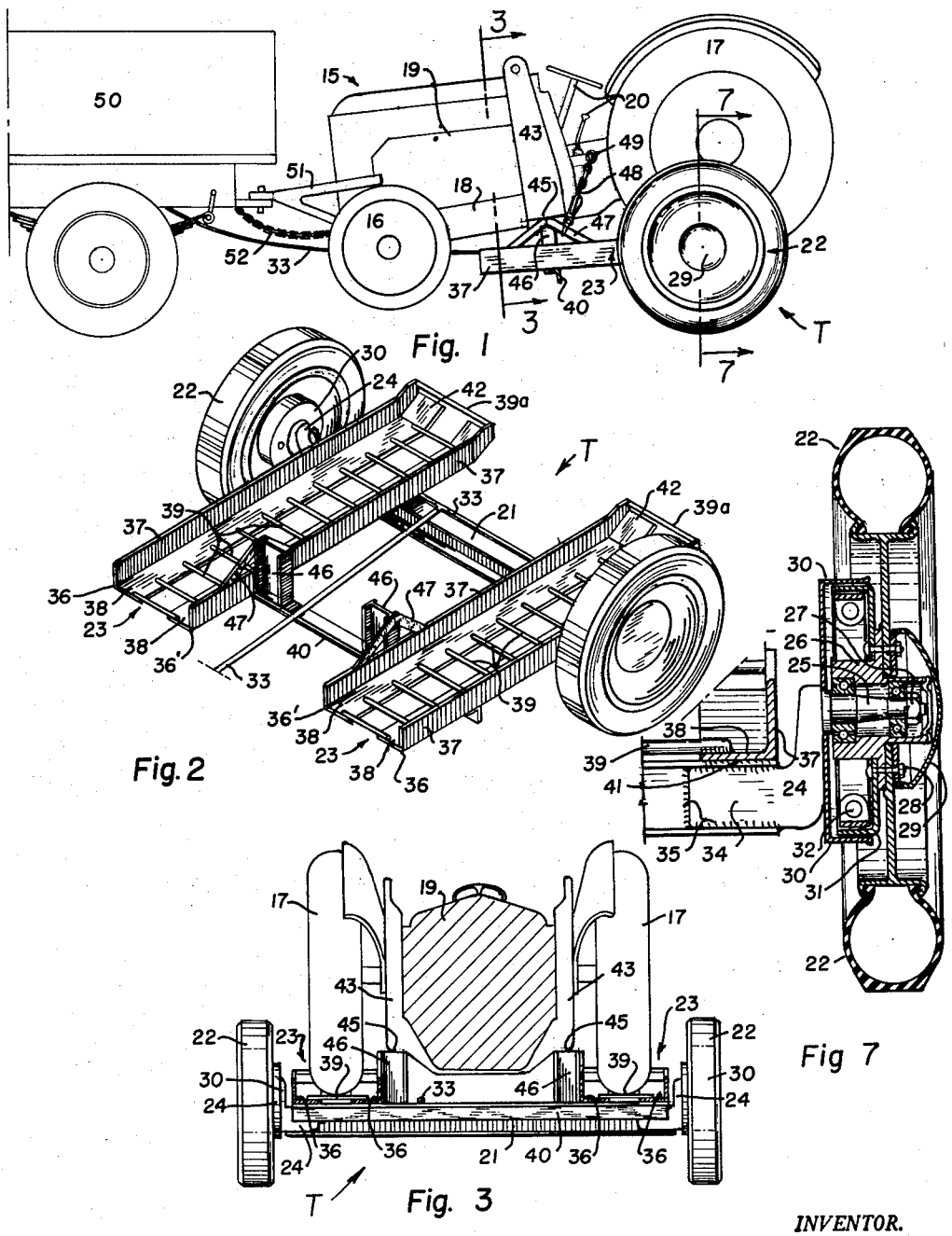
INVENTOR.
James J. Rogers
BY WHITEHEAD, VOGL & LOWE
PER Frank C. Lowe
ATTORNEYS INVENTOR.
James J. Rogers
BY WHITEHEAD, VOGL & LOWE
PER Frank C Lowe
ATTORNEYS United States Patent Office 3,147,871
Patented Sept. 8, 1964

3,147,871
LOW-BOY TRAILER
James J. Rogers, 9801 E. Mississippi, Denver 22, Colo.
Filed Nov. 20, 1961, Ser. No. 153,358
2 Claims. (Cl. 214—506)

This invention relates to trailers and more particularly to vehicle-carrying trailers commonly called low-boy trailers, the present invention being an improved vehicle-carrying trailer which might appropriately be classed as such, and will be hereinafter referred to as a low-boy trailer, or simply as a trailer.

A primary object of the invention is to provide a novel and improved vehicle-carrying, low-boy trailer especially adapted to carry wheel tractors of the general type, which is characterized by large diameter-rear drive wheels. Such a tractor is commonly called a farm tractor, or more properly called an industrial four-wheel tractor, and it will be hereinafter referred to as a wheel tractor or simply as a tractor and the invention will be described as being adapted to this type of tractor, although it is to be understood that the invention is not restricted to such a vehicle.

Another important object of the invention is to provide a low-boy type trailer, for tractors and the like, which effects a material simplification over conventional trailer construction by the expedient of eliminating the connective linkage components, including the tongue of a conventional trailer, and using instead, readily available components of a tractor mounted thereon to complete an operational organization of elements for towing purposes.

The large diameter drive wheels of such industrial tractors are rotated at slow speed with a tremendous torque, produced through speed-reducing gears connecting with the drive shaft and by other gears connecting the drive shaft with the tractor motor. The resulting power and versatility of movement possible with these wheel-type tractors make them comparatively low-cost excavating units and it has been a widespread practice of many urban builders and contractors to use the tractor for earth working purposes. Ordinarily, the tractor will be equipped with a loading bucket at its front end and a back hoe or tilling implement at its rear end. A tractor so equipped will usually work in combination with a dump truck. The tractor may be put on a construction site, such as a residence where it will quickly dig the necessary sewer and water trenches, load excess dirt into the truck, fill the trenches and grade the yard about the construction site in a surprisingly short space of time.

When engaged in such activity the tractor will be moved from one site to another as the contractor changes jobs and in going back and forth across town the distance traveled by the tractor will usually exceed the distance the tractor travels while it is actually working. When the tractor is worked with a dump truck, often with one man using both the tractor and truck, it is a common practice to move the tractor by towing it with the truck. This towing operation is either by a trailer hitch of a type which will lift the front steering wheels of the tractor off the ground, or of a type which will lock with the steering mechanism and force the front wheels of the tractor to track with and follow the truck. More often, however, where the tractor has a front loading bucket, the towing operation is performed by hooking the bucket over the tail gate of the truck and bearing the bucket down on the gate until the front wheels of the tractor are lifted off the ground.

While time is saved by such a towing operation, the drag by the tractor is so great that towing can be quite expensive. The towing operation must necessarily be with the tractor drive shaft out of gear. However, the large drive-wheels are connected to the drive shaft by a ring-pinion or worm-wheel at a substantial speed-reducing ratio so that whenever the tractor is being towed at any speed, the drive shaft and gears connecting it with the drive wheels are being rotated at tremendous speeds. It has been discovered that the wear on the rear tires of a tractor when it is being towed is far greater than the wear incurred when the tractor is being worked. Moreover, the pull of a tractor will cause excessive wear on the truck drive-wheels as well as working the truck engine to the limit.

Where heavier crawler types of tractors are used, they are towed by conventional low-boy trailers which are ordinarily affixed to a special tractor-truck having a fifth wheel arrangement; however, it is to be pointed out that the operation of the class of contractors using wheel tractors of the type herein considered are usually not sufficiently extensive to warrant owning or using such comparatively expensive equipment.

It was with the above considerations in view that the present invention was conceived and developed, and the invention comprises, in essence, a low cost low-boy trailer adapted to carry only the rear drive wheels of the tractor and permit the tractor to be towed by a dump truck or any ordinary truck in the same manner as the tractors are being towed, but without the abusive drag caused by forcing the rear wheels of the tractor to rotate.

It follows that another object of the invention is to provide a novel and improved low-boy trailer for a wheel-type tractor which is adapted to carry only the rear wheels of the tractor and which permits the tractor to be towed by any conveniently available dump truck or like vehicle.

Another object of the invention is to provide a novel and improved low-boy trailer for a wheel tractor which is easy to use, and onto which a tractor may be quickly mounted and connected to a tow truck, and later, be quickly and easily disconnected and dismounted.

Another object of the invention is to provide a novel and improved low-boy trailer for wheel-type tractors which is a comparatively small and lightweight unit which is so inexpensive that it may be assigned to a given tractor to remain with the tractor from job to job or, if desired, may be quickly and easily loaded onto a truck and moved about to be used with several tractors, as needed.

Other objects of the invention are to provide a novel and improved low-boy trailer for a wheel-type tractor which is a simply constructed, neat appearing, rugged and durable unit and which is sufficiently low in cost as to permit its being owned even by small operators having only one or two tractors.

With the foregoing and other objects in view, all of which more fully hereinafter appear, my invention comprises certain novel and improved constructions, combinations and arrangements of parts and elements, as hereinafter described, defined in the appended claims and illustrated in preferred embodiment in the accompanying drawing, in which:

FIGURE 1 is a side elevational view illustrating diagrammatically the rear portion of a towing truck and a wheel-type tractor, with the front end of the tractor being connected to the truck as by a towing yoke of a type which lifts the front wheels of the tractor and illustrating, further, the rear wheels of the tractor as being mounted upon my improved low-boy trailer.

FIGURE 2 is an isometric view of the low-boy trailer per se, as viewed from the forward or leading end of the unit.

FIGURE 3 is a transverse sectional detail as taken substantially from the indicated line 3—3 at FIG. 1.

FIGURE 7 is a fragmentary sectional detail of a portion of the trailer unit as viewed from the indicated line 7—7 at FIG. 1, but on an enlarged scale.

Figure 4:
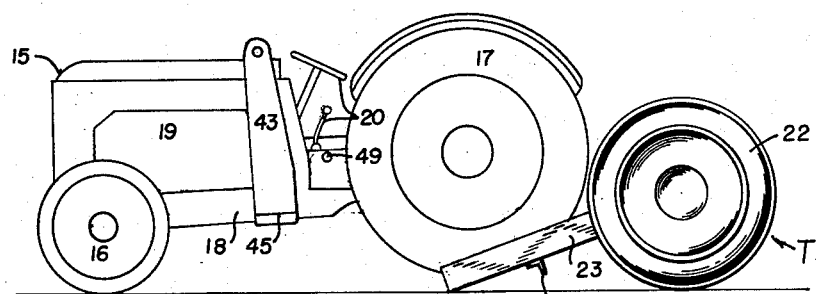
FIGURE 4 is a side elevational view of the tractor and low-boy trailer somewhat similar to the showing at FIG. 1 but with the tractor being only partially upon the trailer as if it were being mounted upon, or dismounted from, the trailer.

A detailed description of the trailer construction and the manner in which it carries an industrial four-wheel tractor may be understood by referring to the drawing. The tractor 15 is illustrated in a diagrammatic manner since it is a common, well known unit, characterized by front steering wheels 16, large diameter rear driving wheels 17 and a body frame 18 mounted upon the wheels. The tractor also includes a motor 19 at the forward end of the unit and driving controls, generally indicated at 20 rearwardly of the motor so that the drivers compartment is between the rear wheels 17, the drivers seat between the wheels not being shown.

The improved low-boy trailer T which is adapted to carry only the large diameter rear drive wheels 17 is a simply constructed two-wheel unit having a transverse support bar 21 extending between a pair of wheels 22 and a pair of longitudinally-disposed ramps 23 is mounted upon the bar 21 in a symmetrical, spaced arrangement to receive the rear tractor wheels 17 whenever the tractor moves upon the trailer as hereinafter described.

A spindle frame 24 is secured to each end of the support bar 21 to carry a wheel 22. The wheel construction and the manner in which the wheel is mounted upon the spindle frame is essentially conventional and therefore need not be described in detail. As illustrated somewhat diagrammatically at FIG. 7, a spindle shaft 25 outstands from the frame 24 and a bearing-retaining wheel hub 26 is secured upon this shaft 25 as by a lock nut 27. The wheel 22 is then secured to the hub by lug bolts 28 and the assembly may be covered as by a hub cap 29, all in a conventional manner.

A conventional braking arrangement is preferably associated with the spindle frame and the hub, and this arrangement may include a brake housing 30 secured onto the spindle frame, a brake drum 31 mounted on the hub 26 and lying within the housing and a brake-shoe and actuating mechanism 32 mounted on the wall of the housing within the brake drum. The brakes may be conventionally actuated by a hydraulic or an electrical system connected with the towing vehicle, and a suitable conduit line 33 interconnecting the two brake assemblies extends forwardly of the trailer for this purpose, as in the manner clearly illustrated at FIG. 2.

The support bar 21 is preferably a structural I-beam member sufficiently heavy to withstand the loads imposed upon it and the spindle frame 24 is necessarily formed as a forged or shaped member having an inwardly directed arm 34 which is adapted to lie against the central web of the beam shaped support bar 21 and to be securely affixed thereto. This spindle frame arm 34 may be welded to the support bar 21 as indicated at 35 or may be otherwise secured to the bar in any suitable manner to provide a strong unitary construction. As clearly illustrated at FIGS. 2, 3 and 7, this spindle frame 24 is formed with the connecting arm 34 being offset and below the spindle to give the unit an underslung construction to obtain improved operational stability.

Each ramp 23 is mounted upon the support bar 21 adjacent to a wheel and the ramp is formed as a channel-shaped member sufficiently wide to easily accommodate a tractor wheel 17. Likewise, the two ramps are spaced apart a distance which corresponds with the gage of the rear tractor wheels so that the tractor 10 may be backed upon the ramps 23 as in the manner clearly illustrated at FIG. 4. The ramps 23 are arranged to extend forwardly from the support bar 21 a distance which is approximately half a tractor length. This provides an unbalanced condition which causes the forward end of the ramps to normally rest upon the ground surface, as clearly illustrated at FIGS. 2 and 4. With the underslung construction, hereinbefore mentioned, the length of the ramps as specified is sufficient to provide a moderate incline in this normal position, with the front ends of the ramps upon the ground.

In preferred construction, each channel-shaped ramp is formed by a pair of stuctural angles 36 and 36' mounted in spaced opposition with upright legs 37 forming the channel sides or flanges. The inturned base legs 38 of the angles form ledges whereon a regularly spaced series of short, transversely disposed bars 39 are affixed, as by welding, thereto, to form a channel-floor structure as a ladder-like array of the bars. The forward end of each ramp is open to facilitate receiving a tractor wheel and a suitable transversely disposed reinforcing bar 40 extends across the underside of the ramps 23 a short distance back of the forward end to secure the members together and to help rigidify the unit, the bar being affixed to the underside of the angle members 36 and 36' as by welding or in any other suitable manner as desired.

The ramps 23 are likewise mounted upon and are affixed to the support bar 21 as by welding the underside of the angle members 36 and 36' to the top side of the support bar 21 as at weld 41 at FIG. 7. Each ramp 23 extends rearwardly from the support bar a short distance and terminates as an abutment 42, the abutment being formed by an upturned lip of the base legs 38 of the angle members and a raised cross bar 39a at the rear end thereof. When a tractor wheel is moved rearwardly and upon a ramp, it will necessarily be stopped by the abutment 42 and this will be its rearward position on the ramp. The short distance each ramp extends rearwardly of the support need be only enough to permit the weight of the tractor to overbalance the ramps and to cause them to tilt from their normal, forwardly-downwardly sloping position. When tilted upwardly, the front end of the ramps will then contact the underside of the tractor body.

Figure 6:
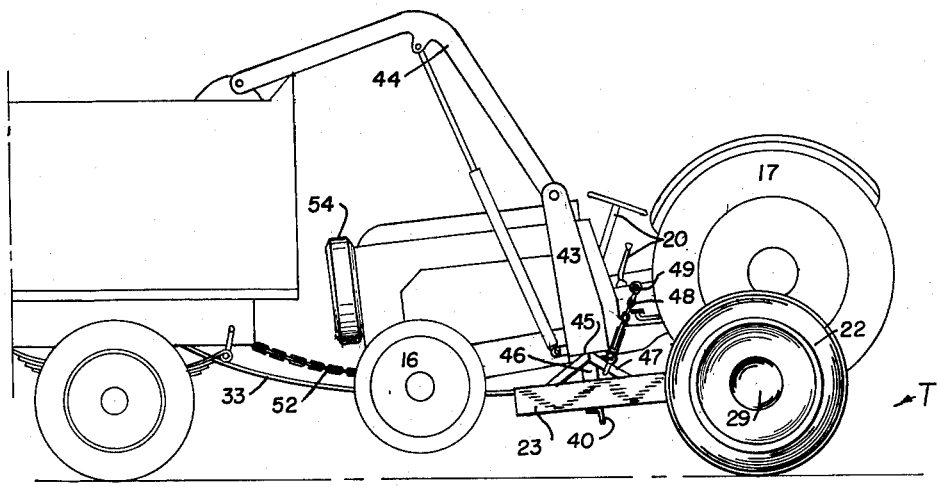
FIGURE 6 is a side elevational view, similar to FIG. 1 but illustrating the tractor as including an earth loading bucket and with the bucket being hooked over the tail gate of the truck and being depressed sufficiently to lift the tractor front wheels off the ground to accomplish a towing arrangement similar to that shown at FIG. 1, but without a special towing bar.

This upward movement of the ramps against the underside of the tractor body will not be with a great force because the offset of the rearward portion of the ramps from the support bar is not great. However, it is desirable that the forward end of the ramps include an abutment means to contact selected portions of the underside of the tractor frame 18 to prevent superficial damage to the tractor and to facilitate holding the ramps in a proper position once set. While such an abutment arrangement may vary depending upon the type of tractor used, a preferred and simple arrangement of abutments is possible where a tractor 15 is converted for earthwork by having a structural collar 43 about the center portion of the body of the type which is ordinarily used to hold the left arms and rams of an excavator bucket 44 as illustrated at FIG. 6.

The undersisde of the collar 43 will have a flat surface 45 at each side of the tractor, as generally illustrated at FIG. 3, and the transverse support bar 40 near the forward end of the ramps may be positioned underneath such surfaces 45 in a manner which will permit a pair of abutment posts 46 to upstand from the bar 40 between the ramps 23 and to contact the collar flats 45 when the ramp is up. Of course, in other tractor arrangements, it is to be understood that the posts may be arranged to contact other selected surfaces at the underside of the tractor frame 18.

The posts 46 are preferably at the side of the inner upright angle legs 37 of the ramps 23 and are reinforcibly secured to the angle legs as by welding. They may be further reinforced as by angled struts 47 extending from the top of the post to the top edge of the inner angle leg 37, as in the manner illustrated. It follows that when the ramps are in the up position with the posts 46 against the collar flats 45, the ramps may be locked in this position as by a hook-latch 48, extending from a connector 49 on the tractor frame 18 to one of the struts 47, as in the manner illustrated at FIG. 1.

With the tractor mounted upon the trailer as above described, it is only necessary to connect the front end of the tractor to a towing truck 50. The arrangement at FIG. 1 illustrates a towing yoke 51 of a type which holds the front wheels of the tractor off the ground, and since such a towing yoke of this type is conventional, it is illustrated in a diagrammatic manner. To complete the connection with the truck 50, the brake actuating conduit line 33 is extended to the truck and to connect with conventional actuating means, not shown. Also, a safety chain 52 is connected from the tractor to the truck to comply with local safety ordinances.

Figure 5:
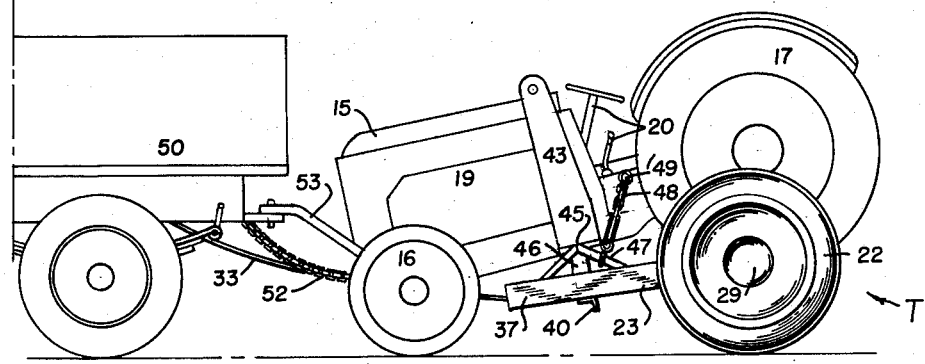
FIGURE 5 is a side elevational view, similar to FIG. 1, but showing the tractor as being connected to the truck by a towing tongue of a type which permits the front steering wheels of the tractor to remain upon the ground, but necessarily holds these wheels in tracking position behind the truck.

The connection of the tractor to the towing truck 50 may be with a tow bar 53 of the type which permits the steering wheels to remain upon the ground and which locks and restricts the action of the steering wheels to force them to track with the truck movement. Such a tow bar, as illustrated at FIG. 5 is also a conventional unit and hence is not illustrated in detail.

The connection of the tractor to the towing truck 50 may also be by simply hooking the excavator bucket 44 over the tailgate of the truck and by pulling the bucket downwardly with sufficient force upon the tailgate of the truck as to lift the front wheels of the tractor, as in the manner illustrated at FIG. 6. In this arrangement, the brake actuating conduit 33 will be extended to the truck, and the safety chain will be connected from the tractor to the truck, as heretofore described. Also, a bumper 54, such as an old tire, may be mounted at the front of the tractor to prevent damage if the tractor slips forwardly and against the truck as might occur by a sudden stopping of the truck when the tractor is being towed.

The manner in which the tractor is dismounted from the trailer is as simple as the manner in which it is mounted. When the towing means are disconnected, the hook-latch 48 is next disconnected, and the tractor is simply driven forward on the ramps. As soon as this forward movement commences, the ramps will drop to their normal position and the tractor movement may continue until it is completely off the ramps.

I have now described my invention in considerable detail. However, it is obvious that others skilled in the art can build and devise alternate and equivalent arrangements which are within the spirit and scope of my invention. Hence, I desire that my protection be limited, not by the specific details as described, but only by the proper scope of the appended claims.

I claim:
1. In combination with a towing vehicle and a wheel-type tractor of the type having large diameter rear driving wheels, a forwardly extending body frame mounted upon the wheel and a transversely disposed equipment collar embracing the body of the tractor near its medium section with the collar having spaced, flat, surfaces portions at its under side, a low-boy trailer adapted to raise the rear wheels of the tractor to facilitate towing the same and a connecting means at the front of the tractor adapted to engage the towing vehicle and to lift the front end of the tractor, and wherein the low-boy trailer comprises:
   (a) a transversely disposed support bar having upturned ends with a spindle outstanding from each end thereof substantially above the support bar;
   (b) a pair of wheels supporting the bar with a wheel being mounted on each spindle at each end of the bar;
   (c) a pair of longitudianlly disposed ramps mounted upon the support bar with a ramp being near each end of the bar, and spaced apart to receive the tractor rear wheels, and with each ramp including a forwardly extending front portion adapted to normally extend forwardly and downwardly at a moderate incline to contact the earth level, and a short rearwardly extending rear portion;
   (d) an abutment at the rear end of each ramp adapted to stop the wheel movement of the tractor when it moves rearwardly and upon the ramp, said abutment being located rearwardly of the support bar at a position which permits the weight of the tractor on the rear wheels to overbalance the ramps and cause the front portion thereof to swing upwardly and against the underside of the tractor body; and,
   (e) a transverse support between the front portion of each ramp having a pair of spaced, upstanding posts aadpted to engage said collar surfaces when the front portion of the ramp swings upwardly by movement of the tractor rear wheels on the ramp and past the support bar with said pot being adapted to limit the upswing to a position not substantially beyond the horizontal when the front end of the trailer is lifted.
2. In the organization set forth in claim 1, wherein said connecting means comprises a conventional loader bucket carried at the front of the tractor.

References Cited in the file of this patent
UNITED STATES PATENTS

| | | |
|---|---|---|
| 97,009 | Wheeler | Nov. 16, 1869 |
| 1,125,227 | Weaver | Jan. 19, 1915 |
| 1,188,033 | Bihler | June 20, 1916 |
| 1,739,364 | Lake | Dec. 10, 1929 |
| 2,541,582 | Hawkins | Feb. 13, 1951 |
| 2,628,733 | Hale | Feb. 17, 1953 |
| 2,639,926 | Parks | May 26, 1953 |
| 2,705,081 | Jacobs | Mar. 29, 1955 |
| 2,794,565 | Ratliff | June 4, 1957 |
| 2,966,965 | Stair | Jan. 3, 1961 |
| 3,035,812 | Wineteer | May 22, 1962 |